United States Patent [19]
Stier

[11] 4,044,440
[45] Aug. 30, 1977

[54] CUTTING TOOL

[76] Inventor: Henry W. Stier, 8134 Lochdale, Dearborn Heights, Mich. 48127

[21] Appl. No.: 661,125

[22] Filed: Feb. 25, 1976

[51] Int. Cl.² .................................................. B26D 1/00
[52] U.S. Cl. ............................................................ 29/96
[58] Field of Search ................................... 29/95 R, 96

[56] References Cited
U.S. PATENT DOCUMENTS

| 3,137,918 | 6/1964 | Breuning | 29/96 |
| 3,341,923 | 9/1967 | Kelm | 29/96 |
| 3,525,136 | 8/1970 | Crosby | 29/96 |
| 3,787,941 | 1/1974 | Novkov | 29/96 |
| 3,821,837 | 7/1974 | Faber | 29/95 R |

*Primary Examiner* — Leonidas Vlachos
*Attorney, Agent, or Firm* — Hauke & Patalidis

[57] ABSTRACT

A cutting tool of the type consisting of a support member provided with a pocket for removably receiving a cutting bit and provided with a holding arrangement for clamping the removable cutting bit in the pocket, such holding arrangement comprising a pin having a head portion engageable with a surface of the cutting bit and a body extending in a cylindrical recess in the support member, a laterally projecting portion on the pin in engagement with an inner surface of the cylindrical recess, and spring bias means for a threaded member exerting on the end of the pin a force causing the pin to apply a force on the cutting bit in the general direction holding the cutting bit against the bottom of the pocket and against the sidewalls of the pocket.

22 Claims, 5 Drawing Figures

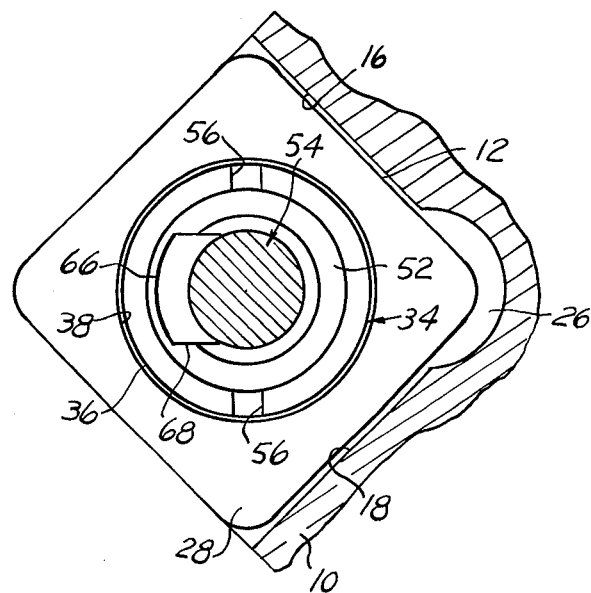
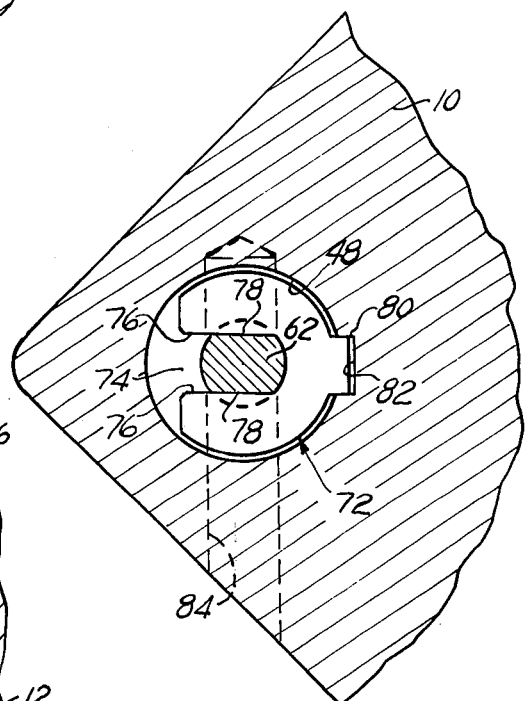
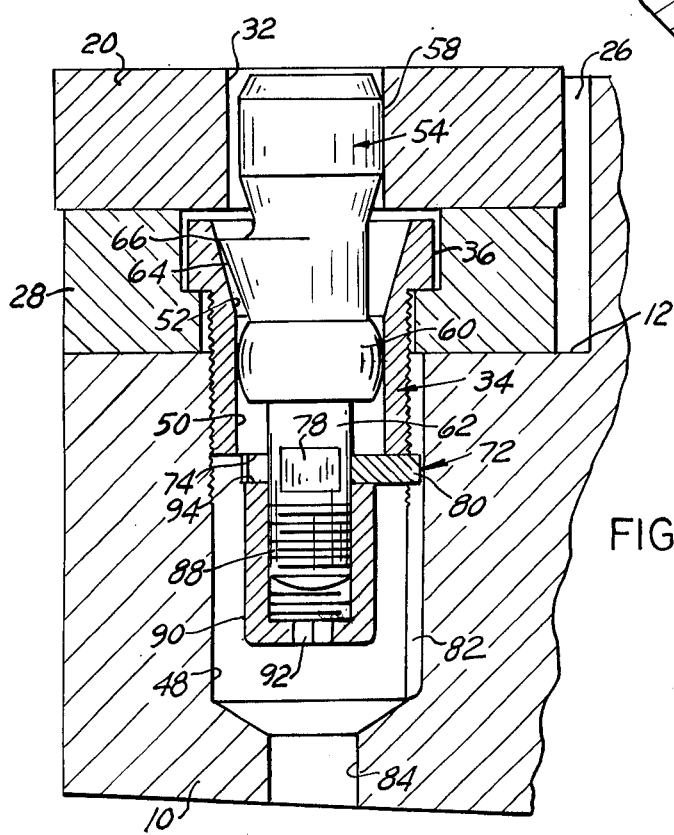

CUTTING TOOL

BACKGROUND OF THE INVENTION

The present invention belongs to the general field of cutting tools consisting of the combination of a support member or holder and a removable cutting insert or cutting bit supported in the pocket, with a cutting edge of the cutting bit exposed for engaging a workpiece.

Cutting tools provided with a cutting insert made of an ultra-hard material such as a metallic carbide or the like are arranged to either support the cutting bit on the end of a holder made of steel or like material brazed in position or held in position by locating and clamping means. The present invention belongs to the latter category of cutting tools, namely to the type of cutting tool provided with a removable, generally indexable throwaway cutting insert, held in position in a pocked formed at a portion generally at the end of a holder.

Cutting tools wherein the cutting bit is in the form of an indexable, throw-away cemented carbide or the like insert require that means be provided for holding the cutting bit in position in the support member or holder. Such holding means includes clamps, set screws, holding bolts, eccentric pins, etc., which are designed to hold the cutting bit in a pocket in the tool holder with the lower face of the cutting bit firmly applied to the bottom surface of an anvil or shim disposed on the bottom of the pocket. In order to properly index the position of the bit cutting edge or point relative to the holder, the holding or clamping means are often designed so as to firmly apply at least one side surface, preferably two consecutive side surfaces, of the cutting bit against corresponding sidewalls of the pocket. In order to achieve such results, the holding or clamping means for the removable indexable cutting insert or bit often consist of a plurality of independent parts cooperating with each other, and are therefore costly to manufacture, are subject to breakage and failure, and generally do not permit accurate adjustment of the intensity and direction of the clamping forces.

SUMMARY OF THE INVENTION

The present invention provides a cutting tool structure wherein a removable indexable cutting bit is held securely in an appropriate recess or pocket in a support member or holder with a minimum amount of cooperating elements, and with no obstruction or interfering projection from the top surface of the cutting bit or from the support member, which may be objectionable in most cutting operations. In addition, the present invention permits to effectively clamp a cutting bit in a tool holder pocket while permitting to adjust the force of clamping to the minimum required for secure holding of the cutting bit in the pocket without distorting or damaging the cutting bit, the shim, or the pocket surfaces. The present invention accomplishes its objects by providing as a clamping and holding means a pin disposed in a cylindrical recess in the support member, having an end or head portion in engagement with a lateral surface of the cutting bit or preferably, when in use in combination with a cutting bit provided with a centrally disposed mounting hole, in frictional engagement with the inner surface of the mounting hole, and applying to the cutting bit a force in the appropriate directions urging the cutting bit in engagement with the bottom surface of the pocket and simultaneously in engagement with at least one lateral wall of the pocket, as a result of applying on the end of the pin disposed in the cylindrical recess in the support member a force tending to pull the pin within the recess while simultaneously causing a swinging motion of the pin about a fulcrum point.

The many objects and advantages of the present invention will become apparent to those skilled in the art when the following description of examples of structural embodiments of the invention is read in conjunction with the accompanying drawing. The examples of the invention hereinafter described in detail are given for illustrative purpose only, and not in any restrictive manner whatsoever, for the purpose of explaining the principle of the invention.

BRIEF DESCRIPTION OF THE DRAWINGS

FIG. 3 is a transverse section substantially along line 3—3 of FIG. 2;

FIG. 4 is a transverse section substantially along line 4—4 of FIG. 2; and

FIG. 5 is a partial view similar to FIG. 2, but showing a modification thereof.

DETAILED DESCRIPTION OF THE PREFERRED EMBODIMENTS

Figure 1:
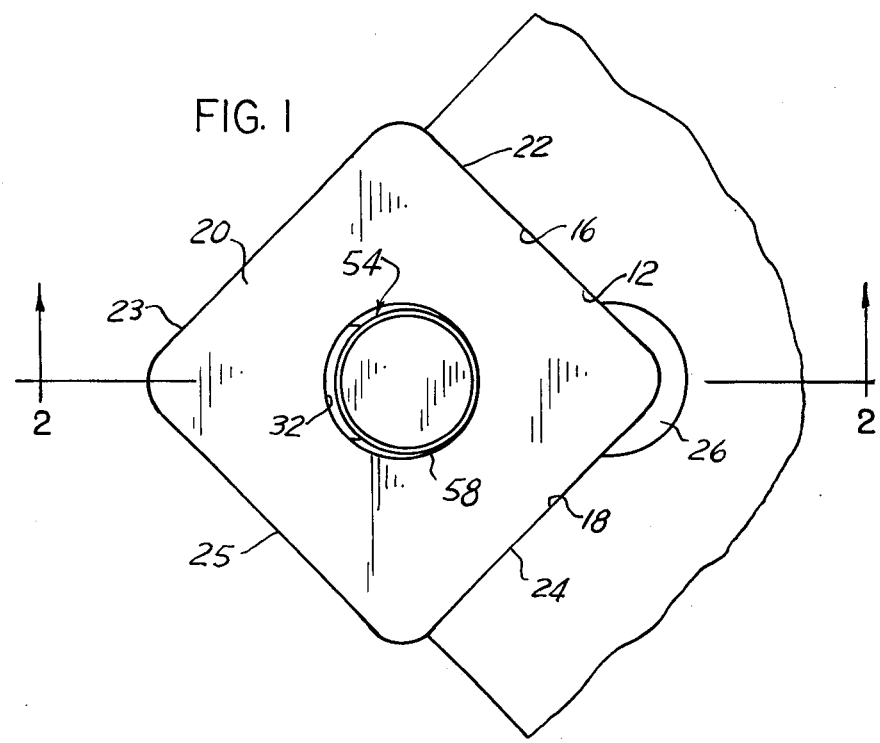
FIG. 1 is a top plan view of an example of cutting tool according to the present invention.

Referring now generally to FIGS. 1-4, a cutting tool according to the present invention comprises a support member or holder 10, the end portion of which only is illustrated, and which is generally in the form of a block of steel or like material adapted for mounting on the tool post of a machine such as a machine lathe or the like. The support member 10 is provided on its end with a recess or pocket 12 having a bottom surface 14, and in the example illustrated, a pair of sidewalls 16 and 18. A cutting insert or bit 20 is disposed in the recess 12. In the example illustrated, the cutting insert 20 is square in plane view and has a pair of side surfaces 22 and 24 in engagement with the sidewalls 16 and 18, respectively, of the pocket 12 and a pair of side surfaces 23 and 25 projecting beyond the terminal edges of the support member 10 for presenting appropriate cutting edges for action on a workpiece, not shown. In order to prevent dirt, metallic chips, and the like from interfering with accurate indexing and location of the cutting bit 20 in the pocket 12 with its lateral faces 22 and 24 properly engaged with the sidewalls 16 and 18 of the pocket, a recess or relief clearance, as shown at 26, is provided at the junction of the sidewalls 16 and 18.

Figure 2:
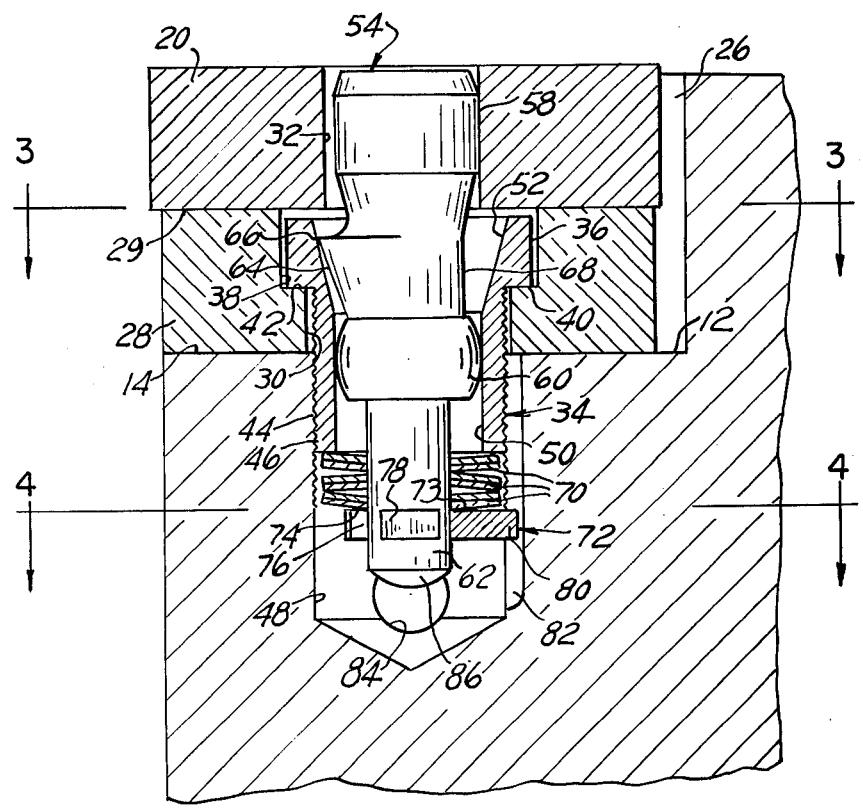
FIG. 2 is a sectional view substantially along line 2—2 of FIG. 1.

As best shown at FIG. 2, an anvil or shim 28 is disposed between the bottom surface 14 of the pocket 12 and the lower surface 29 of the cutting bit 20. The anvil or shim 28 is made preferably of an ultra-hard material, such as cemented carbide or the like, having an upper and a lower surface appropriately smoothly ground, and it is provided with a centrally located bore 30 having an axis generally aligned with the axis of a mounting hole 32 formed at the center of the cutting bit 20. The anvil or shim 28 is held securely in position on the bottom surface 14 of the pocket 12 by means of a sleeve retainer 34 having an enlarged head portion 36 engaged in an enlarged diameter bore portion 38 of the bore 30 in the anvil or shim 28. The enlarged head portion 36 of the shim sleeve retainer 34 thus forms a shoulder 40 which engages a step annular surface 42 in the bore 30, when the retainer 34, provided with a threaded body portion 44, is driven into the threaded portion 46 of a cylindrical bore or recess 48 extending through the mass of the support member 10 directly below the pocket 12. It is to be noted that the axis of the cylindrical recess 48, of the bore 30 in the anvil or shim 28 and of the mounting hole 32 in the cutting bit 20 are substantially aligned, as seen in the drawing.

The shim retainer 34 has a cylindrical inner bore 50 provided with an upper frusto-conical end portion 52. A pin 54 is disposed in the bore 50. As best seen at FIG. 3, the top surface of the enlarged portion 36 of the retainer member 34 is provided with diametrically opposed cut-out sections 56 accepting the end of an appropriate tool or spanner for driving in rotation the shim retainer 34 for driving in turn its threaded body portion 44 into the cylindrical recess 48, thereby appropriately tightening the anvil or shim 28 on the bottom surface 14 of the pocket 12 and holding it secure in the pocket.

The pin 54 is generally cylindrical in shape and, as best shown at FIG. 2, is formed with a cylindrical or, alternatively if so desired, a slightly barrel-shaped head portion, 58 of a diameter slightly smaller than the diameter of the mounting hole 32 in the cutting bit 20. The pin 54 has an intermediate partially spherical portion 60 of a diameter providing a sliding fit within the inner bore 50 of the shim retainer 34. The end or foot portion 62 of the pin 54 has a diameter substantially less than the diameter of the internal bore 50 of the shim retainer 34.

Disposed between the partial spherical portion 60 of the pin 54 and its cylindrical head portion 58, there is a frusto-conical portion 64 having generally a greater taper than that of the frusto-conical bore portion 52 of the shim retainer 34. The pin frusto-conical portion 64 has an edge 66 capable of engaging the surface of the frusto-conical bore portion 52. In order to provide appropriate side and back clearance for the frusto-conical portion 64 of the pin 54 disposed within the frusto-conical bore 52 of the shim retainer 34, the frusto-conical surface 64 of the pin extends only part of the way about the periphery of the pin, the remaining portion having been milled away, as shown at 68 at FIGS. 2 and 3.

A plurality of dished compression springs 70 are disposed loosely about the reduced diameter end portion 62 of the pin 54, and a spring retainer 72 is mounted on the reduced diameter portion 62 of the pin 54 such as to constantly exert a predetermined amount of pull of the lower end of the pin as a result of compressing the superimposed dished springs 70 between the upper face 73 of the spring retainer 72 and the annular end face 74 of the shim retainer 34. As best shown at FIG. 4, the spring retainer 72 is substantially in the form of a disk of a diameter slightly less than the diameter of the cylindrical recess 48 in the support member 10, provided with a slot 74 open to one side and defining two parallel faces 76 disposed at a distance less than the diameter of the end portion 62 of the pin 54. The parallel faces 76 of the spring retainer 72 normally engage flat grooves 78 formed on diametrically opposite sides of the pin end portion 62. The spring retainer 72 has a radially projecting tang 80 engaged in a lateral longitudinal slot 82 formed in the cylindrical recess 48 in the support member 10, such that the spring retainer 72, in addition to holding the dished springs 70 in compression, further prevents the pin 54 from rotating about its longitudinal axis.

The dished springs 70 are, as best shown at FIG. 2, preferably disposed in pairs, each pair consisting of two springs 70 oriented in the same direction, i.e., with their faces parallel and in mutual engagement. Consecutive pairs of springs 70 are preferably oriented in opposite directions, such that, the three pairs of springs 70 shown at FIG. 2 are arranged to cause the upper pair of springs 70 to be in engagement with the annular terminal face 74 of the shim retainer 34 about the peripheral edge of the upper spring 70. By disposing the springs 70 in such manner by pairs, the force exerted by the springs is doubled, as compared to the force exerted by a single spring, while the maximum amount of compression travel causing the springs 70 to flatten to a given degree is the same as would result from the use of three springs instead of three pairs.

The pull exerted by the compressed dished spring 70 on the end of the pin 54 through the intermediary of the spring retainer 72 pulls the pin downwardly, as seen in the drawing and more particularly in FIG. 2, with the result that the edge 66 of the frusto-conical portion 64 of the pin engages the frusto-conical surface 52 of the shim retainer 34 causing the head portion 58 of the pin to be urged simultaneously downwardly, as seen in the drawing, and towards the right as a result of the combined camming action of the edge 66 of the frusto-conical portion 64 of the pin sliding downwardly along the frusto-conical surface 52 and the pivoting action of the pin 54 about the fulcurm point defined by the edge 66. A peripheral portion of the surface of the pin head portion 58 being frictionally engaged with a portion of the surface of the mounting hole 32 of the cutting bit 20, the camming and pivoting action tends to apply the cutting bit 20 with its bottom surface 29 firmly engaged with the upper surface of the shim or anvil 38 and its side surfaces 22 and 24 firmly engaged with the sidewalls 16 and 18 of the pocket 12. The spherical surface portion 60 of the pin constantly engages the cylindrical surface of the cylidrical bore 50 in the shim retainer 34 and acts as an axially sliding locating means for the sliding fulcrum point formed by the edge 66 of the pin frusto-conical portion 64 in engagement with the frusto-conical surface 52 of the shim retainer 34.

For the purpose of releasing the cutting bit 20 when it is desired to replace a worn cutting bit by a new one, or when it is desired to index a fresh cutting edge for action on a workpiece, a tool such as a metallic rod, punch, screw driver, or the like, is introduced through a lateral access bore 84 and is used as a lever or a drift for applying on the end 86 of the pin 54 a force opposite to the force exerted by the compressed dished springs 70, such as to remove from the cutting bit 20 the force applying it in the pocket 12. The cutting bit 20 may therefore be removed and re-indexed, or a new cutting bit may be placed in the pocket 12 with its mounting hole 32 disposed about the head portion 58 of the pin 54 and, by removing the counter-acting pressure from the end 86 of the pin 54, the cutting bit is automatically clamped in position in the pocket 12 with the appropriate required force as determined by the geometry of the pin 54, the size and number of dished springs 70 and the predetermined compression preload applied on the springs.

It can thus be seen that, among the many advantages provided by the present invention, the amount of clamping force exerted on the cutting bit 20 is constantly and repeatedly the same without requiring any judgment on the part of a machine operator, the cutting bit is held in the tool holder pocket without any portion of the holding pin 54 projecting from the upper face of the bit and without the use of any obstructive projecting clamping means, and the cutting bit may be removed by means of a simple tool and with a single hand action.

FIG. 5 illustrates a modification of the invention which is identical to the arrangement hereinbefore described and illustrated at FIGS. 1-4 but wherein the arrangement for exerting a pull on the end of the pin 54, instead of being in the form of spring biased means, consists of the illustrated arrangement comprising a peripheral thread 88 formed on the end of the reduced diameter portion 62 of the pin 54 on which is threaded a sleeve-like member in the form of a cap nut 90 provided on its end face with an hexagonal pocket 92. In this arrangement, the retainer 72 is disposed between the annular end face 94 of the cap nut 90 and the annular end face 74 of the shim retainer 34, with its tang 80 projecting in the longitudinal slot 82 in the cylindrical recess 48 in the support member 10, to prevent rotation of the pin 54 when the cap nut 90 is tightened or loosened by means of an Allen-type wrench inserted in the hexagonal pocket 92 of the cap nut through the access aperture 94 disosed at the bottom of the support member 10. It will be appreciated that the arrangement of FIG. 5 also permits to clamp a cutting bit in a pocket in the support member by way of a simple one hand operation, and permits to adjust the clamping force exerted on the cutting bit for holding it in the pocket, to any desired value within the mechanical capacity of the diverse elements.

The tool holder of the present invention is assembled by disposing the pin 54 in position within the shim retainer 34, with either the assembly consisting of the spring 70 and the retainer 72 fastened to an end of the pin, as shown in FIG. 2, or the retainer 72 and the cap nut 90 mounted on the end of the pin, as shown at FIG. 5. The shim retainer 34 is then threaded into the cylindrical recess 48 in the support member 10, with the tank 80 of the retainer 72 being engaged in the longitudinal slot or groove 82.

Having thus described the present invention by way of examples of practical embodiments thereof given for illustrative purpose only, modifications whereof will be apparent to those skilled in the art, what is claimed as new is as follows:

1. In a cutting tool comprising in combination a support member, a pocket on one end of the support member, a removable cutting bit disposed in the pocket with a portion thereof exposed for cutting engagement with a workpiece, and means for holding the cutting bit in the pocket, the improvement of said holding means comprising a cylindrical recess in said support member, a pin disposed in said cylindrical recess and having an end portion in engagement with a surface of said cutting bit, a laterally projecting portion on said pin having an end in engagement with an inner surface of said cylindrical recess, means for applying a force on the other end of said pin in a general direction holding said cutting bit in said pocket comprising spring means disposed about said pin proximate said other end thereof and spring retainer means maintaining said spring means in a compressed state between said spring retainer means and a shoulder abutment formed in said cylindrical recess, and means preventing rotation of said pin relative to said cylindrical recess.

2. The improvement of claim 1 wherein said spring means is at least one dished spring.

3. The improvement of claim 1 wherein said spring means is at least a pair of dished springs, said springs in the pair being disposed with their faces substantially mutually parallel.

4. The improvement of claim 1 wherein said spring means is three pairs of dished springs, said springs in each pair being disposed with their faces substantially mutually parallel and the first pair of said springs being engaged with said shoulder abutment with the apex of said springs directed toward the other end of said pin and each pair of said srings having its apex sequentially in an opposite direction.

5. The improvement of claim 1 wherein said spring retainer means comprises a disk shaped clip, a slot extending diametrically part of the way from an edge of said clip, said slot having substantially parallel edges inserted in diametrically opposed peripheral grooves formed in said pin, and a tang laterally projecting from said clip for engagement in a longitudinal slot formed in said cylindrical recess.

6. The improvement of claim 1 wherein said cylindrical recess comprises a frusto-conical surface end portion disposed proximate said cutting bit, and said laterally projecting portion on said pin is disposed in engagement with said frusto-conical surface.

7. The improvement of claim 7 wherein said laterally projecting portion is frusto-conical and has a conicity larger than the conicity of said frusto-conical surface.

8. The improvement of claim 1 wherein said pin has a partially spherical peripheral surface between said laterally projecting portion and said spring means, said partially spherical surface being in sliding engagement with said cylindrical recess.

9. The improvement of claim 1 further comprising an access aperture in said support member leading to said other end of said pin for introduction therethrough of a tool for exerting a force in an opposite direction to remove said cutting bit from said pocket.

10. In a cutting tool comprising in combination a support member, a pocket on one end of the support member, a removable cutting bit disposed in the pocket with a portion thereof exposed for cutting engagement with a workpiece, and means for holding the cutting bit in the pocket, the improvement of said holding means comprising a cylindrical recess in said support member, a pin disposed in said cylindrical recess and having an end portion in engagement with a surface of said cutting bit, a laterally projecting portion on said pin having an end in engagement with an inner surface of said cylindrical recess, and means for applying a force on the other end of said pin in a general direction holding said cutting bit in said pocket, wherein said means for applying a force on the other end of said pin comprises a peripheral thread at the end of said pin and a sleeve-like member having an internal thread in engagement with said peripheral thread, said sleeve-like member having an end face engaged with a retainer member engaged in turn with a shoulder abutment formed in said cylindrical recess, said retainer member having means preventing said pin from rotating relative to said cylindrical recess when said sleeve-like member is turned.

11. The improvement of claim 10 wherein said means preventing said pin from rotating is a tang laterally projecting from said retainer member engaged in a longitudinal slot formed in said cylindrical recess.

12. The improvement of claim 10 wherein said cylindrical recess comprises a frusto-conical surface end portion disposed proximate said cutting bit, and said laterally projecting portion on said pin is disposed in engagement with said frusto-conical surface.

13. The improvement of claim 12 wherein said laterally projecting portion is frusto-conical and has a conicity larger than the conicity of said frusto-conical surface.

14. The improvement of claim 10 wherein said pin has a partially spherical peripheral surface between said laterally projecting portion and said means for applying a force on the other end of said pin, said partially spherical surface being in sliding engagement with said cylindrical recess.

15. In a cutting tool comprising in combination a support member, a pocket on one end of the support member, a removable cutting bit disposed in the pocket with a portion thereof exposed for cutting engagement with a workpiece, and means for holding the cutting bit in the pocket, the improvement of said holding means comprising a cylindrical recess in said support member, a pin disposed in said cylindrical recess and having an end portion in engagement with a surface of said cutting bit, a laterally projecting portion on said pin having an end in engagement with an inner surface of said cylindrical recess, and means for applying a force on the other end of said pin in a general direction holding said cutting bit in said pocket comprising spring means disposed about said pin proximate said other end therof and spring retainer means maintaining said spring means in a compressed state between said spring retainer means and a shoulder abutment formed in said cylindrical recess, wherein said spring retainer means comprises a disk shaped clip, a slot extending diametrically part of the way from an edge of said clip, said slot having substantially parallel edges inserted in diametrically opposed peripheral grooves formed in said in, and a tang laterally projecting from said clip for engagement in a longitudinal slot formed in said cylindrical recess.

16. The improvement of claim 15 wherein said spring means is at least one dished spring.

17. The improvement of claim 15 wherein said spring means is at least a pair of dished springs, said springs in the pair being disposed with their faces substantially mutually parallel.

18. The improvement of claim 15 wherein said spring means in three pairs of dished springs, said springs in each pair being disposed with their faces substantially mutually parallel and the first pair of said springs being engaged with said shoulder abutment with the apex of said springs directed toward the other end of said pin and each pair of said springs having its apex sequentially in an opposite direction.

19. The improvement of claim 15 wherein said cylindrical recess comprises a frusto-conical surface end portion disposed proximate said cutting bit, and said laterally projecting portion on said pin is disposed in engagement with said frusto-conical surface.

20. The improvement of claim 19 wherein said laterally projecting portion is frusto-conical and has a conicity larger than the conicity of said frusto-conical surface.

21. The improvement of claim 15 wherein said pin has a partially spherical peripheral surface between said laterally projecting portion and said spring means, said partially spherical surface being in sliding engagement with said cylindrical recess.

22. The improvement of claim 15 further comprising an access aperture in said support member leading to said other end of said pin for introduction therethrough of a tool for exerting a force in an opposite direction to remove said cutting bit from said pocket.

* * * * *

UNITED STATES PATENT OFFICE
CERTIFICATE OF CORRECTION

Patent No. 4,044,440    Dated August 30, 1977

Inventor(s) Henry W. Stier

It is certified that error appears in the above-identified patent and that said Letters Patent are hereby corrected as shown below:

Column 5, line 22, "disosed" should be --disposed--.

Column 6, line 24, "claim 7" should be --claim 6--.

Column 7, line 36, "in" should be --pin--.

Signed and Sealed this

Twenty-second Day of November 1977

[SEAL]

Attest:

RUTH C. MASON  
Attesting Officer

LUTRELLE F. PARKER  
Acting Commissioner of Patents and Trademarks